US010137410B2

(12) United States Patent  
Raynal et al.

(10) Patent No.: US 10,137,410 B2  
(45) Date of Patent: Nov. 27, 2018

(54) METHOD OF DEACIDIZING A GASEOUS EFFLUENT BY AN ABSORBENT SOLUTION WITH VAPOR INJECTION INTO THE REGENERATED ABSORBENT SOLUTION AND DEVICE FOR IMPLEMENTING SAME

(71) Applicant: IFP Energies nouvelles, Rueil-Malmaison (FR)

(72) Inventors: Ludovic Raynal, Oullins (FR); Matthieu Dreillard, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 281 days.

(21) Appl. No.: 14/929,583

(22) Filed: Nov. 2, 2015

(65) Prior Publication Data

US 2016/0250590 A1 Sep. 1, 2016

(30) Foreign Application Priority Data

Nov. 4, 2014 (FR) ..................................... 14 60635

(51) Int. Cl.
*B01D 53/78* (2006.01)
*B01D 53/14* (2006.01)
(Continued)

(52) U.S. Cl.
CPC ......... *B01D 53/78* (2013.01); *B01D 53/1425* (2013.01); *B01D 53/1462* (2013.01); (Continued)

(58) Field of Classification Search
None
See application file for complete search history.

(56) References Cited

U.S. PATENT DOCUMENTS 3,084,110 A * 4/1963 Polk ....................... B01D 3/322  
                                            165/108  
3,101,996 A * 8/1963 Bresler ................ B01D 53/526  
                                            423/229

(Continued)

FOREIGN PATENT DOCUMENTS

FR        2 898 284        9/2007  
FR        2 966 732        4/2012  
(Continued)

OTHER PUBLICATIONS

"The Contactor", Optimized Gas Treating, Inc. vol. 7, Issue 2, Feb. 2013 (Year: 2013).*  
PCT Search Report in FR 1460635 dated Jun. 29, 2015.

*Primary Examiner* — Anita Nassiri-Motlagh  
(74) *Attorney, Agent, or Firm* — Fitch, Even, Tabin & Flannery LLP

(57) ABSTRACT

The invention is a method for deacidizing a gaseous effluent comprising acid compounds, such as $CO_2$ and/or $H_2S$, and a device for implementing the method, through contact with a demixing absorbent solution. Regeneration is performed by vapor injection into the liquid guard (202) formed by the regenerated absorbent solution in the bottom of regeneration column (G). The vapor is generated within a reboiler (203) from a fraction of the regenerated absorbent solution withdrawn from the regeneration column. Vapor injection enables convective movement of the liquid for preventing any decantation phenomenon in the bottom of the regeneration column bottom which is harmful to the smooth operation of the deacidizing process.

28 Claims, 2 Drawing Sheets

(51) Int. Cl.
*B01D 53/18* (2006.01)
*B01D 53/62* (2006.01)
(52) U.S. Cl.
CPC ......... *B01D 53/1493* (2013.01); *B01D 53/18* (2013.01); *B01D 53/62* (2013.01); *B01D 2252/204* (2013.01); *B01D 2258/0283* (2013.01)

(56) References Cited

U.S. PATENT DOCUMENTS 4,160,810 A * 7/1979 Benson .............. B01D 53/1425
423/220
2013/0015406 A1* 1/2013 Gazarian ............ B01D 53/1425
252/373

FOREIGN PATENT DOCUMENTS

WO 2011/095703 8/2011
WO 2012/067101 5/2012
WO 2013/132962 9/2013

* cited by examiner

METHOD OF DEACIDIZING A GASEOUS EFFLUENT BY AN ABSORBENT SOLUTION WITH VAPOR INJECTION INTO THE REGENERATED ABSORBENT SOLUTION AND DEVICE FOR IMPLEMENTING SAME

CROSS REFERENCE TO RELATED APPLICATION

Reference is made to French Patent Application No. 14/60,635, filed on Nov. 4, 2014, which application is incorporated herein by reference in its entirety.

BACKGROUND OF THE INVENTION

Field of the Invention

The present invention relates to the field of gas deacidizing using an absorbent solution, for example to treat combustion fumes, decarbonation, or natural gas or gas of industrial origin deacidizing.

Description of the Prior Art

Gas deacidizing methods using aqueous amine solutions for removing the acid compounds present in a gas, notably carbon dioxide ($CO_2$), hydrogen sulfide ($H_2S$), carbon oxysulfide (COS), carbon disulfide ($CS_2$), sulfur dioxide ($SO_2$) and mercaptans (RSH) such as methylmercaptan ($CH_3SH$), ethylmercaptan ($CH_3CH_2SH$) and propylmercaptan ($CH_3CH_2CH_2SH$), are commonly used. The gas is deacidized through contact with the absorbent solution, then the absorbent solution is thermally regenerated.

In the field of energy for example, the combustion of fossil resources leading to $CO_2$ discharge to the atmosphere is a major problem, as it is recognized that the increase of $CO_2$ in the atmosphere contributes to global warming. To reduce this type of emission, one solution captures and stores the $CO_2$ discharged by combustion, notably from coal power plants. A $CO_2$ capture process separates the $CO_2$ from the other constituents of the fumes resulting from the combustion of fossil resources, thus allowing the $CO_2$ to be transported in concentrated form to an underground storage site. Thus, the $CO_2$ is sequestered in the underground reservoir instead of being discharged to the atmosphere.

To date, a reference method for capturing CO2 washes the combustion fumes with a basic absorbent solution, for example an aqueous monoethanolamine solution. The basic solution circulates between two columns. One operates at low temperature and enables washing of the gas by absorption of the acid species contained in the gas, such as $CO_2$, and also $H_2S$, $SO_2$, COS, etc. The other operates at high temperature and allows the absorbent solution to be regenerated by releasing the acid species it contains. The temperature increase in the second column results from heating the absorbent solution in the regenerator bottom using heating which is generally by water vapor.

One drawback of this type of deacidizing method lies in the high energy consumption involved. In an electric power plant for example, installing a $CO_2$ capture process reduces the energy efficiency in the plant with part of the energy produced by the combustion of fossil resources being consumed by the capture unit and is not used for power production.

It is thus essential to minimize the energy consumption of such processes, in particular the energy consumption related to the regeneration of the absorbent solution.

It has been recently proposed to use absorbent solutions having the property of forming two liquid phases that can be immiscible depending on the temperature or $CO_2$ feed ratio conditions. Such a phenomenon of fractionation of the solution into two immiscible phases is also referred to as demixing phenomenon. Patents FR-2,898,284 and EP-1,656,983 describe for example methods using this type of absorbent solution. In these methods, fractionated regeneration is performed, which regenerates only part of the absorbent solution resulting from a stage of separating the solution into two liquid phases upstream from the regeneration column. Thus, such fractionated regeneration allows the regeneration-related energy expenditure to be lowered.

However, a problem linked with the use of such solutions is that an undesired phase separation harmful to the performances of the process may occur in the regeneration column. In fact, the partition ratio between the two phases depends on the temperature and sometimes also on the $CO_2$ feed ratio. Thus, if a large part of the phase separation can indeed be performed at an intermediate stage between the absorption and the regeneration columns, it is very likely that a new separation occurs within the regeneration column. During the intermediate phase separation stage, the temperature is lower and the $CO_2$ feed ratio is higher than the value obtained in the regeneration column bottom. The physicochemical properties of the fluid portion from the intermediate separation stage, generally the heavy phase obtained by decantation, evolve when the fluid portion passes from the decantation drum to the regeneration column. From a homogeneous fluid, the fluid portion can again separate into two immiscible phases in the regeneration column, and the fluid obtained in the column bottom can settle. Two phases form one above the other, as in the stage of separation by decantation between the absorption and regeneration columns, but with different distribution properties between the phases. This demixing involves a risk of inadequate operation of the process. Conventionally, the fluid is pumped from the regeneration column bottom in order to be sent to the absorption column and is used again for absorption of the acid compounds. In case of decantation in the column bottom, only the heavy phase is pumped and the light phase accumulates above. The regenerated absorbent solution sent to the absorber is thus freed of its light phase with which the absorbent solution would have returned to a single-phase state while cooling. Therefore, the absorbent solution at the absorption column inlet does not have the expected chemical product concentrations and the process is less efficient.

One solution for avoiding decantation in the column bottom could be by carrying out a liquid recirculation in the column bottom by a pump. With a sufficient recycle ratio, satisfactory liquid stirring could be obtained so as to avoid decantation of the phases. However, such a solution using a pump for liquid recirculation would be costly in terms of material investment and operating costs, notably if the liquid recycle ratio is high.

SUMMARY OF THE INVENTION

The present invention provides a solution to the problem of phase segregation of a demixing absorbent solution in the bottom of a regenerator.

More generally, the present invention is a device and a method for deacidizing a gaseous effluent by use of an absorbent solution allowing minimizing the absorbent solution regeneration energy, as well as the investment and operating costs related to this regeneration, while ensuring that the composition of the regenerated absorbent solution fed to the absorption column does not vary significantly over time, to ensure good process performance in terms of amount of absorbed acid compounds.

The present invention uses an original injection of the vapor produced by a reboiler in the regeneration column bottom in order to generate a global motion of the absorbent solution in the column bottom and thus to provide good mixing of the phases.

In order to reach at least one of the aforementioned goals, among others, the present invention provides, according to a first aspect, a method of deacidizing a gaseous effluent containing acid compounds such as $CO_2$ and/or $H_2S$, comprising:

a) contacting the gaseous effluent with an absorbent solution in an absorption column, to obtain a gaseous effluent depleted in acid compounds and an absorbent solution laden with acid compounds, with the absorbent solution being selected for its property to form two separable liquid phases when it has absorbed an amount of acid compounds and it is heated;

b) separating the absorbent solution laden with acid compounds into a first liquid fraction depleted in acid compounds and a second liquid fraction enriched in acid compounds;

c) regenerating the second liquid fraction in a regeneration column to release part of the acid compounds and to obtain a regenerated absorbent solution, by injecting vapor resulting from the partial vaporization in a reboiler of a first part of the regenerated absorbent solution withdrawn from the regeneration column, the vapor injection being achieved in a liquid reserve made up of a second part of the regenerated absorbent solution in the regeneration column bottom to provide stirring of the second part of the regenerated absorbent solution;

d) recycling the first liquid fraction obtained in stage b) and the regenerated absorbent solution obtained in stage c) as the absorbent solution to stage a).

The vapor is preferably injected in the bottom of the liquid reserve.

The first part of the regenerated absorbent solution can be withdrawn from a tray located above the liquid reserve.

Advantageously, the vapor is injected into the liquid reserve at a superficial velocity ranging between 1 cm/s and 1 m/s.

The vapor is preferably injected into the liquid reserve at a given superficial velocity and the superficial velocity can be controlled by separating the partly vaporized absorbent solution from the reboiler into a first stream forming the vapor injected into the liquid reserve and into a second vapor stream injected above the liquid reserve, and by controlling the first and second streams.

Advantageously, the circulation of the regenerated absorbent solution between the regeneration column and the reboiler is provided by a thermosiphon effect.

In this case, the thermosiphon effect can be controlled by at least one of varying a first height $H_1$ defined by the level difference between a draw-off tray from which the first part of the regenerated absorbent solution is withdrawn and the top of the liquid reserve, and by varying a second height $H_2$ defined by the level difference between the point of injection of the vapor into the liquid reserve and the point of injection of the first part of the regenerated absorbent solution in the reboiler.

Prior to separation stage b), the absorbent solution laden with acid compounds can be heated, preferably to a temperature ranging between 60° C. and 140° C., so that the absorbent solution forms two separable liquid fractions.

The absorbent solution can comprise between 10 wt. % and 90 wt. % of at least one reactive compound reacting with at least one of the acid compounds, and between 10 wt. % and 90 wt. % water.

The reactive compound can be an amine, preferably selected from the group made up of N,N,N',N'-TetraMethylHexane-1,6-DiAmine (TMHDA), N,N-DiEthyl-EthanolAmine (DEEA), N,N,N',N'-TetraEthylDiEthyleneTriAmine (TEDETA), N,N,N'-TriEthyl-EthyleneDiAmine (TEEDA), N-DiIsoPropylEthyleneDiAmine (DIPEDA), N,N,N',N'-Tetra-MethylDiPropyleneTriAmine (TMDPTA), N,N,N',N', N''-PentaMethylDiPropyleneTriAmine (PMDPTA).

The gaseous effluent can be selected from among natural gas, syngas, combustion fumes, blast furnace fumes, refinery gas such as syngas, cracked gas, fuel gas, acid gas from amine units, Claus tail gas, biomass fermentation gas, cement plant gas and incinerator fumes.

The method according to the invention is advantageously implemented for the capture of $CO_2$ preferably contained in combustion fumes.

According to a second aspect, the invention relates to a device for deacidizing a gaseous effluent comprising acid compounds such as at least one of $CO_2$ and $H_2S$, for implementing the method according to the invention, comprising:

an absorption column for contacting the gaseous effluent with an absorbent solution to produce a deacidized gas and an absorbent solution laden with acid compounds, the absorbent solution being selected for its property to form two separable liquid phases when it has absorbed an amount of acid compounds and it is heated;

separation device for separating the absorbent solution laden with acid compounds into a first liquid fraction of absorbent solution depleted in acid compounds and a second liquid fraction of absorbent solution enriched in acid compounds;

a regeneration column for releasing the acid compounds contained in the second liquid fraction and for producing a regenerated absorbent solution, the regeneration column being equipped with at least one reboiler for forming vapor through partial vaporization of a first part of the regenerated absorbent solution withdrawn from the regeneration column, and the regeneration column (G) comprising a liquid reserve in the column bottom including at least a second part of the regenerated absorbent solution, and a vapor injector immersed in the liquid reserve for injecting the vapor into the reserve;

means for recycling the first liquid fraction from the separation means and the regenerated absorbent solution from the regeneration column as the absorbent solution to the absorption column.

According to an embodiment, the device comprises a draw-off tray positioned above the liquid reserve for collecting the first part of the regenerated absorbent solution, and a line with an inlet opening into the tray for sending the first part of the solution to the reboiler.

According to an embodiment, the device comprises a main line connecting the reboiler to the vapor injector in order to send a first vapor stream to the liquid reserve, and a bypass line provided with a valve and arranged on the main line for sending a second vapor stream above the liquid reserve.

BRIEF DESCRIPTION OF THE DRAWINGS

Other features and advantages of the invention will be clear from reading the description hereafter of embodiments given by way of non-limitative examples, with reference to the accompanying figures wherein.

In the drawings, the same reference numbers designate identical or similar elements.

DETAILED DESCRIPTION OF THE INVENTION

In the present description, the term demixing designates the phenomenon of separation into two liquid phases of a single-phase liquid absorbent solution. An absorbent solution is a solution that can absorb acid compounds of a gaseous effluent, such as $CO_2$, $H_2S$, COS, $CS_2$, $SO_2$, mercaptans, under suitable operating conditions (temperature, pressure, physical gas/liquid contacting elements). The adjective demixing is used in reference to the demixing phenomenon. A demixing absorbent solution thus is an absorbent solution that can form two separable liquid phases when it comprises an amount of acid compounds.

Deacidizing Plant and Method According to the Invention

Figure 1:
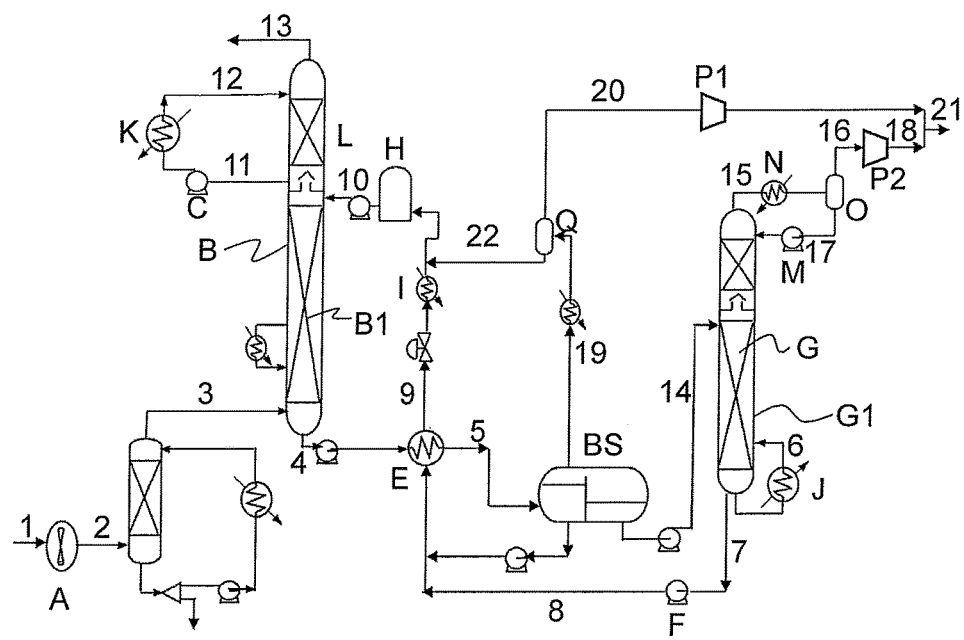
FIG. 1 is a diagram of a gas deacidizing plant according to the invention.

FIG. 1 schematically shows an implementation of the deacidizing method according to the invention where a demixing absorbent solution is used.

In particular, the example of implementation selected and shown in FIG. 1 relates to the capture of $CO_2$ in combustion fumes.

Combustion fumes are notably produced by the combustion of hydrocarbons, biogas, coal in a boiler or for a combustion gas turbine, for example in order to produce electricity. By way of example, a deacidizing method according to the invention can be implemented in order to absorb at least 70%, preferably at least 80% or even at least 90% of the $CO_2$ contained in combustion fumes. These fumes generally have a temperature ranging between 20° C. and 60° C., a pressure ranging between 1 and 5 bar, and they can contain between 50 and 80% nitrogen gas, between 5 and 40% carbon dioxide, between 1 and 20% dioxygen, and some impurities such as SOx and NOx if not been removed upstream from the deacidizing process.

The gas flows in through line 1 at atmospheric pressure and at a temperature that can range between 20° C. and 60° C.

The gas flowing in through line 1 can be compressed by element A, which is a blower or a compressor, that provides a pressure increase of the order of 150 to 200 mbar. Element A allows compensation for the head losses successively encountered in downstream units as described below, such as the cooling tower, the absorption section and the washing section.

The gas can be sent through line 2 to a cooling tower. Water washing is performed in the cooling tower, with the main objective of cooling the fumes, generally in order to reach a temperature between 40° C. and 50° C., to thermodynamically promote absorption of the $CO_2$ in the absorption column bottom. This cooling through direct contact with water can also reduce the residual particles contained in the fumes, such as unburnt particles or dusts.

The gas is then fed into line 3 opening onto the bottom of an absorption column B provided with gas-liquid contacting elements B1, for example trays, random or structured packing elements, forming an absorption section. In the through line 10 at the top of the absorption section. The gas circulates counter-current to the liquid solution with the absorbent solution flowing under the effect of gravity and downward past the upward fumes. The absorbent solution captures the acid compounds, notably the $CO_2$ contained in the gas. Gas-liquid contacting elements B1, a packing for example, allow a maximum exchange surface between the gas and the liquid to be obtained to provide optimum $CO_2$ capture efficiency. An absorbent solution laden with acid compounds is discharged through line 4 in the bottom of column B. A deacidized gas, that is depleted in acid compounds, is obtained at the top of section B1.

The deacidized gas can be sent to a washing section L downstream from section B1 in order to remove the chemical compounds from the absorbent solution that have passed into the deacidized gas, by vaporization or mechanical entrainment, such as amines, their degradation products, or other organic or inorganic compounds. This wash section L can also allow controlling the overall water balance of the process by regulating the outlet temperature of the decarbonated fumes. This washing section is for example arranged in the same column as the absorption column and it comprises gas-liquid contacting elements such as trays, random or structured packings. The water injected at the top of the washing section circulates in a counter-current direction to the deacidized gas from absorption section B. The amine-laden water is collected in the bottom of washing section L, for example by a separator tray P. The water is then discharged through line 11 and pumped by pump C, then cooled in exchanger K, for example using the process water prior to being reintroduced through line 12 at the top of washing section L. The deacidized gas depleted in chemical compounds from the absorbent solution is discharged at the top of column B through line 13.

The absorbent solution discharged through line 4 in the bottom of absorption column B is pumped, heated in heat exchanger E, then fed through line 5 to a separation drum BS in order to achieve separation of the different phases of the absorbent solution, notably liquid/liquid separation of the absorbent solution that comprise two immiscible liquid phases. The demixing phenomenon occurs upstream from the separation drum, either in the bottom of the absorption column or after heating in heat exchanger E, which allows demixing to be controlled by heating the solution to above the critical temperature at which the solution laden with acid compounds forms two separable liquid phases. For example, the absorbent solution laden with acid compounds is heated to a temperature ranging between 60° C. and 140° C. Thus, the fluid circulating in line 5 has two separable liquid phases which are a phase rich in acid compounds and a phase poor in the acid compounds is released in gas form. The three phases of the fluid circulating in line 5 are separated in separation drum BS. The gas fraction and the liquid fraction poor in acid compounds are discharged at the top of drum BS through line 19, cooled and separated in a drum Q. The gas fraction from drum Q is sent through line 20 to a compressor P1 to be discharged through line 21 with the cooled and compressed acid gas circulating in line 18 from regeneration column G. The liquid fraction poor in acid compounds is discharged from drum Q through line 22 to be recycled to the absorption column, and it is preferably mixed with the regenerated absorbent solution stream coming from regeneration column G, after passage of the stream through heat exchanger E.

The absorbent solution fraction rich in acid compounds in drum BS is pumped and sent through line 14 to the top of regeneration column G.

Regeneration column G is equipped with gas-liquid separation elements G1, for example trays, random or structured packings. The bottom of column G is equipped with a reboiler J that provides the heat required for regeneration by vaporizing a fraction of the absorbent solution reinjected in column G through a line 6. The operation of the reboiler and the original injection of the absorbent solution in vapor form into regeneration column G is detailed below in connection with the description of FIGS. 2 and 3. In regeneration column G, under the effect of contacting, by means of elements G1, the absorbent solution flowing in through line 14 at the column top with the vapor produced by the reboiler, the acid compounds are released in gas form and discharged at the top of the column through line 15. Several reboilers can be used for the regeneration column in order to provide the thermal energy required for regeneration.

The $CO_2$-rich gas stream is partly liquefied by cooling in exchanger N, then fed to separator 0. The condensates are recycled through line 17 and pump M to the top of column G as reflux. The gas discharged at the top of drum O through line 16 can be sent to another plant for use as raw material and thus be valorized, or liquefied in order to be injected into an underground reservoir. The gas can be compressed by a element P2, then dehydrated so as to obtain a liquid $CO_2$ stream at about 110 bar, of very high purity, for example above 99 vol. % $CO_2$, which is discharged through line 18.

The regenerated absorbent solution, that is depleted in acid compounds, is discharged at the bottom of column G through line 7, optionally pumped by a pump F and fed through line 8 into heat exchanger E in order to be cooled. The cooled absorbent solution is discharged through line 9, optionally expanded, then cooled again in exchanger I and mixed with the absorbent solution fraction poor in acid compounds coming from drum Q through line 22. The absorbent solution made up of this mixture is then fed into buffer tank H allowing storing the solution and optionally providing top-up water or amines, prior to being pumped and fed through line 10 into absorption section B1.

Regeneration can be carried out at a pressure in column G ranging between 1 bar and 7 bar, or even up to 15 bar, and at a temperature ranging between 100° C. and 200° C. which is preferably between 110° C. and 180° C. and more preferably between 120° C. and 170° C. For example, the regeneration temperature in column G ranges between 140° C. and 180° C. and the pressure preferably ranges between 5 and 8.5 bar if $CO_2$ under pressure is desired for downstream use or for compressing the acid gases at the regeneration column outlet to even higher pressures. These pressures typically range between 50 and 200 bar notably for geological storage. The regeneration temperature in column G ranges for example between 110° C. and 135° C. and the pressure ranges between 1.5 bar and 3 bar if the acid gas is discharged to the atmosphere at the regeneration column outlet or sent to a downstream treatment process that does not require a high pressure, such as a Claus process or a tail gas treatment process.

The deacidizing plant according to the invention can comprise at least one of several parallel absorption columns and parallel regeneration columns in order to meet, for example, requirements relative to the amounts of gas to be treated and the plant size specifications.

Figure 2:
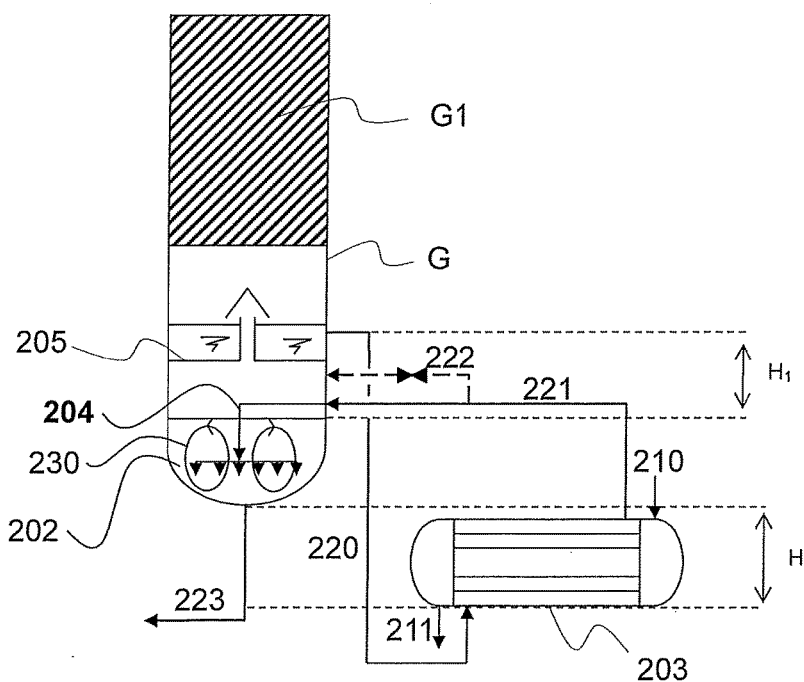
FIG. 2 is a diagram of a regeneration column equipped with a reboiler and provided
with a vapor injector according to the invention.

FIG. 2 schematically is a cutaway view of the injection system for injecting the vapor from the reboiler into the regeneration column according to the invention. Only the lower part of regeneration column G is shown.

Regeneration column G comprises a liquid reserve 202, also commonly referred to as hydraulic guard, positioned in the column bottom, which is made up of the regenerated absorbent solution that is withdrawn therefrom through line 223 to be recycled to absorption column B. Column G also comprises, between this hydraulic guard 202 and gas-liquid contacting elements G1, a collector tray 205 of separate phase tray type comprising chimneys for passage of the vapor phase. The chimneys are sufficiently high to ensure the creation of a liquid guard allowing notably withdrawal of a fraction of the regenerated liquid absorbent solution that is sent to a reboiler 203. The liquid accumulates on withdrawal tray 205 and line 220 sends the accumulated liquid to reboiler 203 to partly vaporize the liquid and to send the resultant vapor to the regeneration column G in order to provide the thermal energy required for regeneration of the absorbent solution.

Alternatively, regeneration column G does not have tray 205 and withdrawal of the regenerated absorbent solution fraction which is sent to the reboiler can be performed in the upper part of hydraulic guard 202.

A hot fluid 210, which is generally overheated vapor, is sent to reboiler 203. As it passes through the reboiler, the fluid is cooled, the vapor condenses which releasing the latent heat thereof, and the cooled fluid 211 leaves reboiler 203. Thus, the energy of fluid 210 is transferred to the regenerated absorbent solution fraction supplied through line 220 and it partly vaporizes the solution fraction. A stream having a vapor phase and a liquid phase, which is transferred to the bottom of regeneration column G, is then collected through a line 221 at the top of the reboiler.

Traditionally, it is common practice is to send this stream between the hydraulic guard and the tray in a conventional regeneration column. In this case, the liquid phase of the stream falls into the hydraulic guard while the vapor phase flows through the tray up to the packing. Generally, circulation of the regenerated absorbent solution between the regeneration column and the reboiler is provided by a thermosiphon effect. That is the density difference between the regenerated absorbent solution streams entering and leaving the reboiler, combined with the height difference between the inlet and outlet points, in the regeneration column, of the regenerated absorbent solution streams, provides circulation of the fluid under the sole effect of gravity. It is therefore not necessary to have a pump for the stream extracted from column G which is sent to the reboiler.

One major drawback with this conventional scheme is that the demixing phenomenon can take place within the regeneration column, and more particularly in the liquid guard in the column bottom, as already described in above. In this case, two liquid phases of different density are present in the column bottom and form two layers arranged one above the other. For example, the denser liquid phase that settles at the bottom of the hydraulic guard essentially comprises water and it is depleted of reactive compounds, as it is the case with an aqueous absorbent solution comprising N,N,N',N'-TetraMethylHexane-1,6-DiAmine as the main reactive compound. In other cases, the heavier phase can conversely be depleted of water and rich in reactive compounds. In any case, this decantation phenomenon in the bottom of the regeneration column is problematic for the smooth operation of the process. With regenerated absorbent solution being conventionally pumped from the hydraulic guard to be recycled in the absorption column, there is a high risk of inadequate operation of the process because only one of the two liquid phases of the absorbent solution is withdrawn. This does not meet the desired composition and the desired performance of the process to provide absorption of the acid compounds in absorption column B.

Unlike the aforementioned conventional regeneration scheme, the invention a specific injection of the regenerated absorbent solution stream from the reboiler which prevents decantation in the liquid guard in the bottom of regeneration column G.

According to the invention, an injection system 204 is provided to inject the vapor from the reboiler into hydraulic guard 202 of regeneration column G which preferably is at the bottom of the hydraulic guard. Injector 204 is thus at least partly immersed in hydraulic guard 202. That is part of the injector from which the vapor comes out is immersed in the hydraulic guard to cause the vapor to be injected into the hydraulic guard. Injector 204 is connected to line 221 supplying the partly vaporized regenerated absorbent solution fraction from the reboiler which has a vapor phase and a liquid phase. The ascending motion of the bubbles produced by this injection induces a strong convective motion of the liquid. Under suitable gas superficial velocity conditions, liquid circulation loops 230 are thus generated which provides mixing of the liquid phases when absorbent solution demixing occurs which prevents any decantation phenomenon.

Preferably, the empty tube superficial velocity of the gas is greater than 1 cm/s, preferably greater than 5 cm/s and more preferably greater than 10 cm/s, and it is less than 1 m/s, preferably less than 50 cm/s and more preferably less than 30 cm/s. The empty tube superficial velocity of a gas is understood to be the ratio of the volume flow rate of a gas meeting the conditions and passing through the section ($m^3/s$) of a pipe to the section of the pipe ($m^2$).

This vapor injection ensures sufficient liquid stirring to prevent a decantation phenomenon in the liquid reserve.

Thus, vapor injection into the hydraulic guard of the regeneration column according to the invention allows the regenerated absorbent solution withdrawn from the column bottom to be indeed made up of two mixed liquid phases, so that the composition of the regenerated absorbent solution fed to the absorption column does not vary significantly over time so as to ensure good performance of the process in terms of amount of absorbed acid compounds. The composition of the absorbent solution is understood to be here its chemical formulation, notably its water and reactive compounds content, independently of the acid compound feed ratio of the solution.

An optional bypass line 222 installed on line 221 and equipped with a valve allows provides that not all of the vapor from the reboiler into the hydraulic guard bottom is reinjected. This bypass line 222 is particularly advantageous for adjusting the superficial velocity of the gas injected in the bottom of the hydraulic guard, notably in order to decrease the velocity if it is too high in case of reinjection of all of the vapor through injector 204.

The thermosiphon effect allows circulation of the regenerated absorbent solution streams entering and leaving reboiler 203, and therefore vapor injection into the hydraulic guard. It is thus possible to avoid using pump type circulation systems that involve additional investments and operating costs. This thermosiphon effect can be advantageously controlled by varying the height between the level of tray P from which the solution fraction is withdrawn through line 220 and the level of the hydraulic guard (upper liquid level in the column bottom) bearing reference $H_1$ in FIG. 2, and/or by varying height $H_2$ as shown in FIG. 2 between the level of the vapor injection point in the guard, that is the bottom of the hydraulic guard, and the level of the solution inlet point in the reboiler, that is the base of the reboiler. For example, the pressure can be increased when injecting the vapor into the liquid guard by increasing at least one of height $H_1$ and height $H_2$.

Other types of reboiler than the reboiler described in connection with FIG. 2 can of course be used in the present invention. Thus, by way of non-limitative example, vertical thermosiphon type reboilers or kettle type submerged bundle reboilers can be used. Also, the reboiler can operate with other devices than overheated vapor for providing calories and vaporizing the absorbent solution, such as electricity or a heat-carrying fluid different from the overheated vapor.

Vapor injection into the hydraulic guard can be achieved using many known gas injection devices that can be immersed form bubbles, such as those used for example in the field of distillation, gas-liquid transfer in gas treatment or water treatment processes (see Ch. 1 and Ch. 9 in Roustan 2003, *Transferts Gaz-Liquide dans Jes Procedes de Traitement des eaux et des Effluents Gazeux*, Lavoisier Eds.). Some existing liquid distribution devices can be suited to achieve gas injection according to the invention. For example, the commercial document "Internals for Packed Columns" (Sulzer Chemtech, Commercial Brochure 22.51.06.40-V.13) describes some liquid distributors whose general configuration could be suited for forming the injector according to the invention, such as the distributor with comb-shaped spray nozzles illustrated in p. 11. Other geometries are possible for the nozzle system, for example a radial arrangement from a central channel, or annular nozzles. An assembly of tubes integrated in the wall of the column at a level corresponding to the liquid guard, comprising orifices and connected to an external supply system on the periphery of the column, can also be provided in the bottom of the column.

Figure 3:
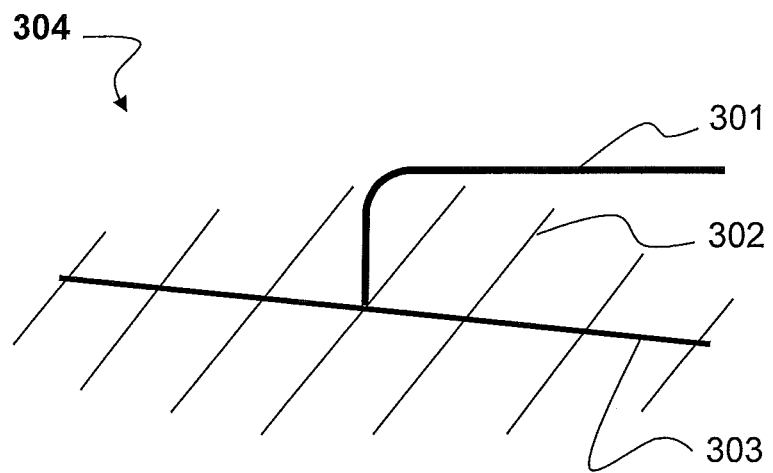
FIG. 3 is a schematic 3D view of an example of a vapor injector used in a regeneration column according to the invention.

Preferably, injector 204 comprises a network of tubes under pressure since these systems are well suited for industrial achievements. These systems, can be as commonly referred to comb-shaped system, as shown in FIG. 3, or in more complex arrangements as described, for example, in U.S. Pat. No. 4,308,855. This patent, which relates to an entirely different field than gas deacidizing, describes for example a bubble distribution structure connected to a vertical pipe wherein gas circulates, allowing bubbles to be formed in a liquid. The bubble distribution structure comprises a network of circular lines of increasing diameter which are configured in a disk connected to one another by transverse lines. The lines comprise a large amount of small orifices distributed over the surface thereof for passage of the gas and formation of bubbles.

FIG. 3 is a schematic 3D view of an example of a vapor injector implemented according to the invention.

Vapor injector 304 comprises a main tube 303 whose diameter is so selected as to limit friction heads, for example so that the friction head losses are less than 0.4 bara, preferably less than 0.2 bara and more preferably less than 0.1 bara. Several tubes 302 are connected to main tube 303 and they have a smaller diameter than main tube 303. Tubes 302 are distributed transversely along main tube 303 to form a comb-shaped network. Main tube 303, which is positioned horizontally for example in the bottom of the hydraulic guard, is connected to a bent line 301 through which the vapor from the reboiler is carried. Tubes 302 are provided with orifices for gas distribution and bubble formation in the liquid where the injector is immersed. The diameter of the various tubes, the size of the orifices and the distribution thereof are se selected as to meet the double requirements of low loss of head and of homogeneity of the gas distribution.

Composition of the Absorbent Solution

The absorbent solution is selected for its capacity to absorb the acid compounds and for its property to form two separable liquid phases when it has absorbed a predetermined amount of acid compounds, under predetermined thermodynamic conditions.

A reactive compound is selected, that is a compound reacting with at least one of the acid compounds of the gas to be treated, or a mixture of reactive compounds having, in the aqueous phase, the property to form two separable liquid phases when it has absorbed a predetermined amount of acid compounds when the temperature is above a critical temperature.

The solution laden with acid compounds can then form, under suitable thermodynamic conditions, a first liquid phase comprising the molecules of the absorbent solution that have not reacted with the acid compounds and a second liquid phase comprising the molecules of the solution that have reacted with the acid compounds.

Thus, this demixing property can be advantageously used to perform a liquid/liquid separation of the solution after absorption of the acid compounds, so only part of the absorbent solution is sent to the regeneration column to achieve a fractionated regeneration of only a fraction of the absorbent solution which is the fraction enriched in molecules that have reacted with the acid compounds. This decreases the energy consumption linked with the regeneration of the solution as described above in connection with FIG. 1.

The demixing phenomenon for a given absorbent solution can be induced by an increase of at least one of the absorbent solution feed ratio and by a temperature rise.

The nature of the reactive compounds of the absorbent solution can be selected according to the nature of the acid compound(s) to be removed to provide a reversible chemical reaction with the acid compound(s) to be treated. The chemical structure of the reactive compounds can also be selected so as to furthermore obtain increased stability of the absorbent solution under the conditions of use.

The reactive compounds can be, by way of non-limitative example, amines (primary, secondary, tertiary, cyclic or not, aromatic or not, saturated or not), alkanolamines, polyamines, amino-acids, amino-acid alkaline salts, amides, ureas, alkali metal phosphates, carbonates or borates.

Preferably, the reactive compound is an amine selected from the group made up of N,N,N',N'-TetraMethylHexane-1,6-DiAmine (TMHDA), N,N-DiEthylEthanolAmine (DEEA), N,N,N',N'-TetraEthylDiEthyleneTriAmine (TEDETA), N,N,N'-TriEthylEthyleneDiAmine (TEEDA), N-DiIsoPropylEthyleneDiAmine (DIPEDA), N,N,N',N'-TetraMethyl-DiPropylene-TriAmine (TMDPTA), N,N,N',N', N''-PentaMethylDiPropyleneTriAmine (PMDPTA).

An aqueous solution generally can be used comprising between 10 wt. % and 80 wt. %, preferably between 20 wt. % and 60 wt. %, more preferably between 30 wt. % and 50 wt. % reactive compound(s) with preferably at least one amine.

An aqueous solution is understood to be a solution containing at least 10 wt. % water.

The absorbent solution can contain between 10 wt. % and 90 wt. % water, preferably between 40 wt. % and 80 wt. % water, and more preferably between 50 wt. % and 70 wt. % water.

The sum of the mass fractions expressed in wt. % of the various compounds of the absorbent solution is 100 wt. % of the absorbent solution.

The absorbent solution can also comprise one or more compounds containing at least one primary or secondary amine function as the activator allowing acceleration of the absorption kinetics of $CO_2$ and, in some cases, of the COS contained in the gas to be treated. For example, the absorbent solution comprises at least 0.5 wt. % and up to a concentration of 30 wt. %, preferably less than 15 wt. % and preferably yet less than 10 wt. % of such a primary or secondary amine. A non-exhaustive list of these activating compounds containing at least one primary or secondary amine function that may go into the formulation is given hereafter:

MonoEthanolAmine
AminoEthylEthanolAmine
DiGlycolAmine
Piperazine
N-(2-HydroxyEthyl)Piperazine
N-(2-AminoEthyl)Piperazine
N-MethylPiperazine
N-EthylPiperazine
N-PropylPiperazine
1,6-HexaneDiAmine
1,1,9,9-TetraMethylDiPropyleneTriamine
Morpholine
Piperidine
3-(MethylAmino)PropylAmine
N-MethylBenzylAmine.

The absorbent solution can also contain other organic compounds. Thus, the absorbent solution can contain one or more additional compounds which are non-reactive with the acid compounds (commonly referred to as "physical solvent"), which promotes the physical solubility of the acid compounds to be absorbed. For example, the absorbent solution can comprise between 5 and 50 wt. % physical solvent such as alcohols, glycol ethers, lactames, N-alkylated pyrrolidones, N-alkylated piperidones, cyclotetramethylenesulfone, N-alkylformamides, N-alkylacetamides, ether-ketones or alkyl phosphates and derivatives thereof. By way of non-limitative example, this additional compound can be methanol, tetraethyleneglycoldimethylether, sulfolane or N-formyl morpholine.

The absorbent solution can also comprise an organic or inorganic acid. A non-exhaustive list of acid compounds that can be used is given below:

formic acid
oxalic acid
acetic acid
propanoic acid
butanoic acid
amino-acid (glycine, taurine, etc.)
phosphoric acid
phosphorous acid
pyrophosphoric acid
sulfuric acid
sulfurous acid
nitrous acid
hydrochloric acid.

Nature of the Gaseous Effluents

It is understood that the treated gas is not limited to combustion fumes and that the desired goal is not limited to $CO_2$ capture as described in connection with FIG. 1. Thus, the gaseous effluents treated can be natural gas, syngas, refinery gas such as syngas, cracked gas, fuel gas, acid gas from amine units, Claus tail gas, biomass fermentation gas, cement or steel plant gas, incinerator fumes or blast furnace fumes.

These gaseous effluents contain one or more of the following acid compounds: $CO_2$, $H_2S$, mercaptans known as RSH (for example methylmercaptan ($CH_3SH$), ethylmercaptan ($CH_3CH_2SH$), propylmercaptans ($C_3H_7SH$), butylmercaptans ($C_4H_9SH$)), COS, $CS_2$, $SO_2$.

More generally than what is described in connection with FIG. 1, the gas to be deacidized entering the deacidizing plant can have a pressure ranging between 1 and 200 bara, and a temperature ranging between 20° C. and 100° C.

The deacidizing method according to the invention can for example be implemented to deacidize natural gas. Natural gas is predominantly made up of gaseous hydrocarbons, but it can contain some of the following acid compounds: $CO_2$, $H_2S$, mercaptans (RSH), COS, $CS_2$. The proportion of these acid compounds is highly variable and it can be up to 70 vol. % for $CO_2$ and up to 40 vol. % for $H_2S$. The temperature of the natural gas can range between 20° C. and 100° C. The pressure of the natural gas to be treated can range between 10 and 200 bar. The invention can be implemented in order to reach specifications generally imposed on the deacidized gas, which are less than 2% $CO_2$, or even less than 50 ppm $CO_2$ prior to carrying out liquefaction of the natural gas, less than 4 ppm $H_2S$ and less than 50 ppm or even less than 10 ppm total sulfur.

The deacidizing method according to the invention can also be implemented for example to deacidize a syngas. Syngas contains carbon monoxide CO, hydrogen $H_2$ (generally with a $H_2$/CO ratio of 2), water vapor (generally at saturation at the wash temperature) and carbon dioxide $CO_2$ (of the order of 10%). The pressure generally ranges between 20 and 30 bar, but it can reach up to 70 bar. It can also comprise sulfur-containing ($H_2S$, COS, etc.), nitrogen-containing (NH3, HCN) and halogenated impurities.

Example

The example below is an example of application of the invention.

This example relates to $CO_2$ capture. According to this example, combustion fumes are treated with a demixing absorbent solution in the plant shown in FIG. 1. The deacidizing plant treats fumes from a 620-MWe coal-fired power plant. The deacidizing plant enables to capture 90% of the $CO_2$ from the power plant fumes, i.e. approximately 440 t/h $CO_2$ captured. The main characteristics of the fumes to be treated are summed up in Table 1 hereafter.

TABLE 1

| Fumes flow rate ($Nm^3$/h) | 1911000 |
| Temperature (° C.) | 45.0 |
| Pressure (atm) | 1.0 |
| Composition (vol. %) | |
| $CO_2$ | 13.04 |
| $N_2$ | 71.83 |
| Ar | 0.92 |
| $O_2$ | 4.63 |
| $H_2O$ | 9.59 |

For this $CO_2$ capture plant, four absorption columns and two regeneration columns are arranged in parallel so as not to exceed 10 meters in diameter for the columns. Table 2 below shows the main characteristics of the $CO_2$ capture plant.

TABLE 2

| Number of absorbers | 4 |
| Number of regenerators | 2 |
| Absorber diameter (m) | 8.9 |
| Regenerator diameter (m) | 8.5 |

The flow rate of the absorbent solution stream entering each regeneration column is around 2600 t/h. The regeneration columns operate at a pressure of approximately 5.0 bara and each regeneration column is equipped with five reboilers. Table 3 hereafter gives the operating conditions at the inlet and outlet of a reboiler.

TABLE 3

| | Parameters | Inlet | Outlet |
|---|---|---|---|
| Total phase (mixed: liquid + gas) | Temperature (° C.) | 137.8 | 145.7 |
| | Volume flow rate ($m^3$/h) | 352.7 | 8560.9 |
| | Density (kq/$m^3$) | 867.5 | 35.7 |
| Liquid phase | Volume flow rate ($m^3$/h) | 352.7 | 317.2 |
| | Density (kq/$m^3$) | 867.5 | 853.5 |
| Gas phase | Volume flow rate ($m^3$/h) | — | 8243.7 |
| | Density (kg/$m^3$) | — | 4.3 |

The absorbent solution being a demixing solution, there is a risk of decantation in the hydraulic guard of the regeneration column. To prevent this phenomenon, the injection of vapor according to the invention is carried out with an injector as described in connection with FIG. 3.

If all of the vapor from the reboilers in the regeneration columns is injected, an empty tube superficial velocity of about 36 cm/s is obtained. This velocity is compatible with the liquid stirring conditions sought in the hydraulic guard. Part of the vapor can optionally be sent back directly to the column as described in FIG. 2 in order to limit the gas velocity. For example, only half of the vapor can be injected in the bottom of the hydraulic guard. This allows obtaining a sufficient gas superficial velocity of approximately 18 cm/s to create liquid circulation loops and to mix the liquid of the hydraulic guard while limiting friction head loss.

Advantageously, adding a pump on the liquid outlet between the regeneration column bottom and the reboiler is not necessary. The thermosiphon effect as described in connection with FIG. 2 can be sufficient to ensure circulation of the regenerated absorbent solution streams entering and leaving the reboilers.

The pressure balance below illustrates the possible use of this thermosiphon effect. The main hypotheses selected for the study are given in Table 4 hereafter.

TABLE 4

| Reboiler head loss (bara) | 0.2 |
| Injection system head loss (bara) | 0.1 |
| Applied margin (bara) | 0.2 |
| Hydraulic guard height (m) | 4.2 |

Heights H1 and H2 described in connection with FIG. 2, obtained with a view to gravity circulation of the fluids between the regeneration column and the reboiler without requiring a pump, are given in Table 5 below.

TABLE 5

| $H_1$ (m) | 3.0 |
| $H_2$ (m) | 3.0 |

Thus the thermosiphon effect is obtained by this example, by heightening the regeneration column by 3 meters in relation to the reboilers and by spacing out the upper level of the hydraulic guard by 3 meters in relation to the draw-off tray.

The invention claimed is:

1. A method of deacidizing a gaseous effluent containing acid compounds, comprising:
   a) contacting the gaseous effluent with an absorbent solution in an absorption column to obtain a gaseous effluent depleted of acid compounds and an absorbent solution laden with acid compounds, the absorbent solution forming two separable liquid phases when an amount of acid compounds have been absorbed and is heated;
   b) separating the absorbent solution laden with acid compounds into a first liquid fraction depleted of acid compounds and a second liquid fraction enriched with acid compounds;
   c) regenerating the second liquid fraction in a regeneration column to release part of the acid compounds and to obtain a regenerated absorbent solution, by injecting vapor resulting from a partial vaporization in a reboiler of a first part of the regenerated absorbent solution withdrawn from the regeneration column, the vapor injection being in a liquid reserve including a second part of the regenerated absorbent solution located in a bottom of the regeneration column to provide stirring of the second part of the regenerated absorbent solution; and
   d) recycling the first liquid fraction obtained in b) and the regenerated absorbent solution obtained in c) as the absorbent solution in a); and wherein the vapor is injected into the liquid reserve at a superficial velocity and the superficial velocity is controlled by separating the partly vaporized absorbent solution from the reboiler into a first stream forming the vapor injected into the liquid reserve and into a second vapor stream injected above the liquid reserve which controls the first and second streams to prevent decanting of the liquid reserve.

2. A method as claimed in claim 1, wherein the vapor is injected in a bottom of the liquid reserve.

3. A method as claimed in claim 1, wherein the first part of the regenerated absorbent solution is withdrawn from a tray located above the liquid reserve.

4. A method as claimed in claim 2, wherein the first part of the regenerated absorbent solution is withdrawn from a tray located above the liquid reserve.

5. A method as claimed in claim 1, wherein the vapor is injected into the liquid reserve at a superficial velocity ranging between 1 cm/s and 1 m/s.

6. A method as claimed in claim 2, wherein the vapor is injected into the liquid reserve at a superficial velocity ranging between 1 cm/s and 1 m/s.

7. A method as claimed in claim 3, wherein the vapor is injected into the liquid reserve at a superficial velocity ranging between 1 cm/s and 1 m/s.

8. A method as claimed in claim 4, wherein the vapor is injected into the liquid reserve at a superficial velocity ranging between 1 cm/s and 1 m/s.

9. A method as claimed in claim 1, wherein circulation of the regenerated absorbent solution located between the regeneration column and the reboiler is provided by a thermosiphon effect.

10. A method as claimed in claim 2, wherein circulation of the regenerated absorbent solution located between the regeneration column and the reboiler is provided by a thermosiphon effect.

11. A method as claimed in claim 5, wherein circulation of the regenerated absorbent solution located between the regeneration column and the reboiler is provided by a thermosiphon effect.

12. A method as claimed in claim 9, wherein the thermosiphon effect is controlled by varying a first height defined by a difference in level between a draw-off tray from which the first part of the regenerated absorbent solution is withdrawn and a top of the liquid reserve, and/or by varying a second height defined by the difference in level between a point of injection of the vapor into the liquid reserve and the point of injection of the first part of the regenerated absorbent solution into the reboiler.

13. A method as claimed in claim 1 wherein, prior to separation b), the absorbent solution laden with acid compounds is heated, to a temperature ranging between 60° C. and 140° C., so that the absorbent solution forms two separable liquid fractions.

14. A method as claimed in claim 3 wherein, prior to separation b), the absorbent solution laden with acid compounds is heated, to a temperature ranging between 60° C. and 140° C., so that the absorbent solution forms two separable liquid fractions.

15. A method as claimed in claim 5 wherein, prior to separation b), the absorbent solution laden with acid compounds is heated, to a temperature ranging between 60° C. and 140° C., so that the absorbent solution forms two separable liquid fractions.

16. A method as claimed in claim 9 wherein, prior to separation b), the absorbent solution laden with acid compounds is heated, to a temperature ranging between 60° C. and 140° C., so that the absorbent solution forms two separable liquid fractions.

17. A method as claimed in claim 1, wherein the absorbent solution comprises between 10 wt. % and 90 wt. % of at least one reactive compound reacting with at least one of the acid compounds, and between 10 wt. % and 90 wt. % water.

18. A method as claimed in claim 3, wherein the absorbent solution comprises between 10 wt. % and 90 wt. % of at least one reactive compound reacting with at least one of the acid compounds, and between 10 wt. % and 90 wt. % water.

19. A method as claimed in claim 5, wherein the absorbent solution comprises between 10 wt. % and 90 wt. % of at least one reactive compound reacting with at least one of the acid compounds, and between 10 wt. % and 90 wt. % water.

20. A method as claimed in claim 9, wherein the absorbent solution comprises between 10 wt. % and 90 wt. % of at least one reactive compound reacting with at least one of the acid compounds, and between 10 wt. % and 90 wt. % water.

21. A method as claimed in claim 12, wherein the absorbent solution comprises between 10 wt. % and 90 wt. % of at least one reactive compound reacting with at least one of the acid compounds, and between 10 wt. % and 90 wt. % water.

22. A method as claimed in claim 13, wherein the absorbent solution comprises between 10 wt. % and 90 wt. % of at least one reactive compound reacting with at least one of the acid compounds, and between 10 wt. % and 90 wt. % water.

23. A method as claimed in claim 13, wherein a reactive compound of the absorbent solution is an amine; selected from a group made up of N,N,N',N'-TetraMethylHexane-1,6-DiAmine (TMHDA), N,N-DiEthylEthanolAmine (DEEA), N,N,N',N'-TetraEthyl-DiEthyleneTriAmine (TEDETA), N,N,N'-TriEthylEthyleneDiAmine (TEEDA), N-DiIsoPropylEthyleneDiAmine (DIPEDA), N,N,N',N'-TetraMethylDiPropyleneTriAmine (TMDPTA), N,N,N',N',N''-PentaMethylDiPropyleneTriAmine (PMDPTA).

24. A method as claimed in claim 1, wherein the gaseous effluent is selected from among natural gas, syngas, combustion fumes, blast furnace fumes, refinery gas such as syngas, cracked gas, fuel gas, acid gas from amine units, Claus tail gas, biomass fermentation gas, cement plant gas and incinerator fumes.

25. A method as claimed in claim 1, comprising capturing $CO_2$ contained in combustion fumes.

26. A method for deacidizing a gaseous effluent comprising acid compounds as claimed in claim 1 wherein:
the absorption column is used for contacting the gaseous effluent with an absorbent solution;
a separation means is used for separating the absorbent solution laden with acid compounds into a first liquid fraction of absorbent solution depleted of acid compounds and a second liquid fraction of absorbent solution enriched with acid compounds;
the regeneration column is used for releasing the acid compounds contained in the second liquid fraction and for producing a regenerated absorbent solution, the regeneration column being equipped with at least one reboiler for forming vapor through partial vaporization of a first part of the regenerated absorbent solution withdrawn from regeneration column, and the regeneration column comprises a liquid reserve in a bottom of the column bottom having at least a second part of the regenerated absorbent solution, and a vapor injector immersed in the liquid reserve for injecting the vapor into the reserve;
means for recycling recycles the first liquid fraction from the separation means and the regenerated absorbent solution from the regeneration column as the absorbent solution to the absorption column.

27. A method as claimed in claim 26, wherein a draw-off tray is positioned above the liquid reserve for collecting the first part of the regenerated absorbent solution, and a line with an inlet opening into a tray sends the first part of the solution to the reboiler.

28. A method as claimed in claim 26, wherein a main line connects the reboiler to the vapor injector for sending a first vapor stream into the liquid reserve, and a bypass line including a valve is disposed in a main line for sending a second vapor stream above the liquid reserve.

* * * * *